United States Patent [19]

Park

[11] Patent Number: 5,725,156
[45] Date of Patent: Mar. 10, 1998

[54] MOISTURE FEEDING APPARATUS FOR PLANTS

[76] Inventor: Hong Ku Park, 203 Southcrest Dr., Huntsville, Ala. 35802

[21] Appl. No.: 529,338

[22] Filed: Sep. 18, 1995

[51] Int. Cl.$^6$ .................... B05B 9/03; B05B 1/20
[52] U.S. Cl. ................ 239/379; 239/302; 239/536; 47/48.5
[58] Field of Search ................ 239/379, 536, 239/302, 327, 328; 47/48.5, 79, 82; 604/408

[56] References Cited

U.S. PATENT DOCUMENTS

| | | | |
|---|---|---|---|
| 2,842,122 | 7/1958 | Butler | 604/408 X |
| 4,002,843 | 1/1977 | Martinez | 47/79 X |
| 4,096,897 | 6/1978 | Cammarata, III | 604/408 |
| 4,157,770 | 6/1979 | Roos | 47/79 X |
| 4,335,769 | 6/1982 | Olson | 604/408 X |
| 4,335,770 | 6/1982 | Kulle et al. | 604/408 |
| 4,829,708 | 5/1989 | Gonzalez | 47/79 X |
| 4,942,692 | 7/1990 | Colbert | 47/79 X |

FOREIGN PATENT DOCUMENTS

| | | | |
|---|---|---|---|
| 622016 | 11/1994 | European Pat. Off. | 239/63 |
| 2717408 | 10/1978 | Germany | 239/63 |

*Primary Examiner*—Lesley D. Morris
*Attorney, Agent, or Firm*—John C. Garvin, Jr.

[57] ABSTRACT

An apparatus for dispensing moisture to one or more plants on a continuing and consistent basis. The moisture dispensing apparatus comprises a reservoir or container, a filament for suspending the reservoir or container from a suspension device, one or more hollow funnels, one or more hollow housings, one or more hollow flexible tubes, and one or more clamping members for adjustably controlling the flow of moisture to the one or more plants.

17 Claims, 1 Drawing Sheet

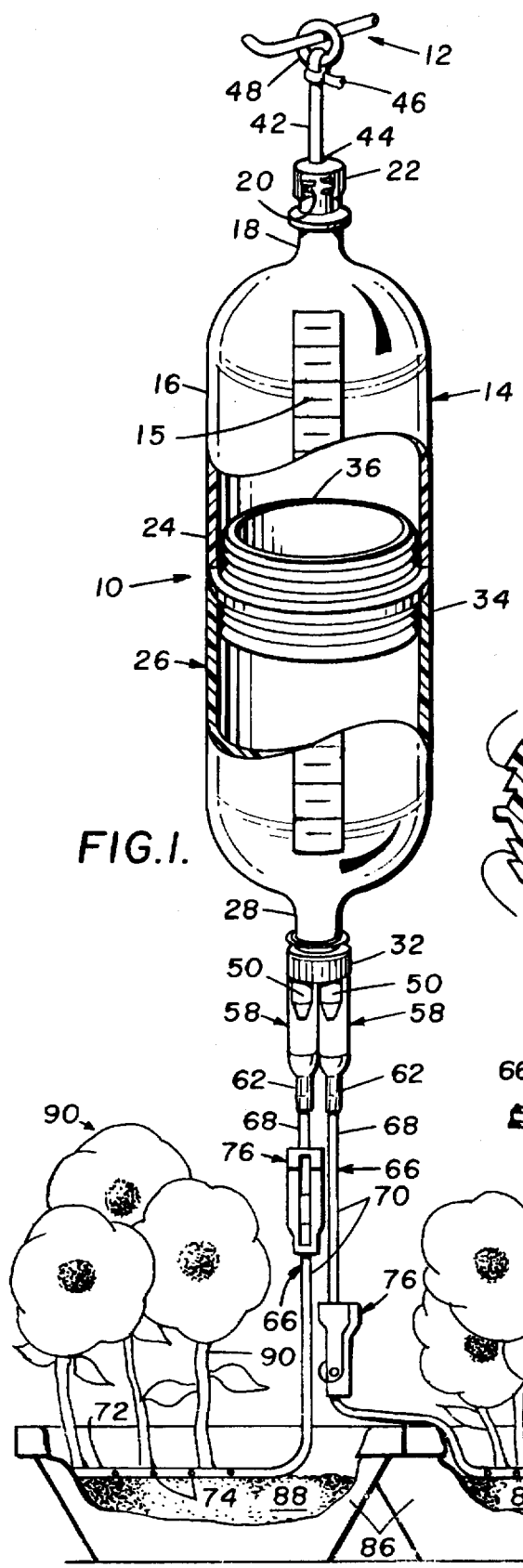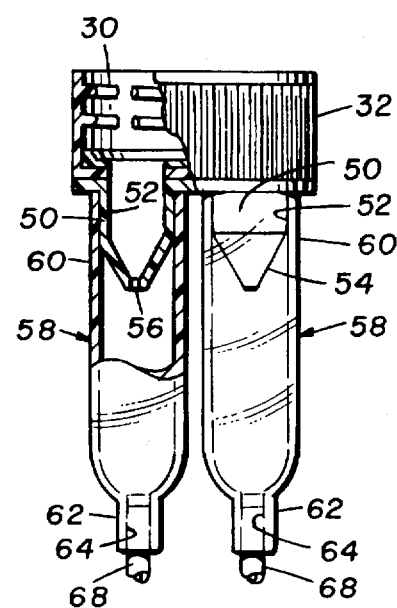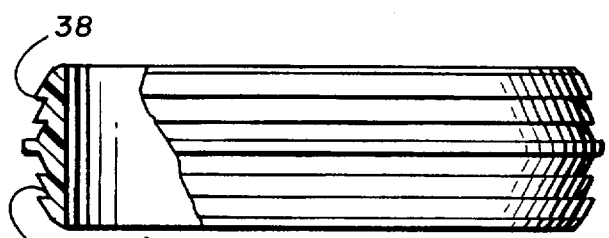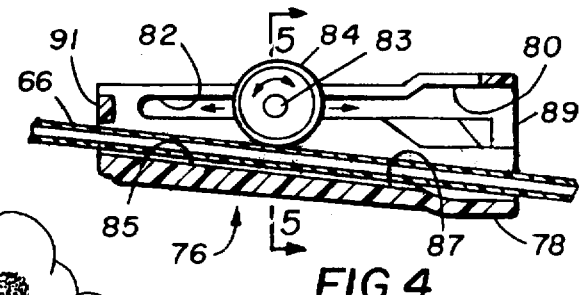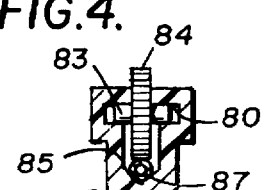

5,725,156

MOISTURE FEEDING APPARATUS FOR PLANTS

FIELD OF THE INVENTION

The invention disclosed herein relates to plant watering apparatuses and more particularly to apparatuses for supplying water or other liquids to plants on a continuous and consistent basis.

BACKGROUND OF THE INVENTION

The prior art abounds with apparatuses for supplying water or other liquids to plants but they have generally suffered from several deficiencies and disadvantages. The following U.S. patents are exemplary of such prior art apparatuses: U.S. Pat. Nos. 3,125,255; 3,168,224; 3,357,129; 4,060,934; 4,578,897; 4,829,708; 4,848,029; 4,942,692; and 5,289,708. Several of these prior art apparatuses utilize a system which is activated in response to water loss by the plants and require complex mechanisms to operate them. Many of the prior art apparatuses include spring loaded valves which are affected by changes in temperatures which often result in the plants being overwatered on very hot days. Still other of the prior art apparatuses require that the plants to be watered must be placed upon the apparatuses themselves. Many other of the prior art apparatuses cannot be utilized with plants positioned in pots or containers which are hung from a ceiling, wall or the like, but can be used solely to water plants positioned in pots or containers located on the floor or ground. Furthermore, many of the prior art apparatuses must be assembled from new parts and cannot be made from bottles or the like which would otherwise take up space in solid waste facilities.

The instant invention relates to an apparatus for supplying moisture to plants on a continuous and consistent basis and which can be made from disposable plastic containers, which overcomes the deficiencies and disadvantages of the prior art apparatus. Of course, the apparatus of the present invention could be made from all new components.

SUMMARY OF THE INVENTION

The present invention relates to a moisture dispensing apparatus for use with plants which can be made in large part from used containers that would otherwise be buried in landfills or treated in a solid waste facility. The moisture dispensing apparatus of the instant invention comprises a reservoir or container, a filament for suspending the reservoir or container from a suspension device, one or more hollow funnels, one or more hollow housings, one or more hollow flexible tubes, and one or more clamping members for adjustably controlling the flow of moisture from the container or reservoir through the hollow funnel, the hollow housing, and the hollow flexible tube to the plant(s).

It is therefore an object of the present invention to provide an improved moisture feeding apparatus for plants.

It is another object of the invention to provide an improved apparatus that feeds moisture on a continuing and consistent basis to plants.

It is yet another object of the invention to provide an improved apparatus which is simple and inexpensive in construction for feeding moisture on a continuing and consistent basis to a single plant or a plurality of plants.

These objects as well as other objects of the present invention will become more readily apparent after reading the following description in conjunction with the accompanying drawings.

BRIEF DESCRIPTION OF THE DRAWINGS

FIG. 1 is a front elevational view, partially broken away and in section, of the moisture feeding apparatus for plants of the present invention.

FIG. 2 is a front elevational view, partially broken away and in section, showing the details of the lower cap, the dual funnels, and funnel housings of the moisture feeding apparatus for plants of the present invention.

FIG. 3 is a front elevational view, partially broken away and in section, of the connecting ring of the moisture feeding apparatus for plants of the present invention.

FIG. 4 is a cross-sectional view of the adjustable clamping device incorporated in the moisture feeding apparatus of the present invention.

FIG. 5 is a cross-sectional view of the adjustable clamping device incorporated in the moisture feeding apparatus of the present invention taken along line 5—5 of FIG. 4.

DETAILED DESCRIPTION OF THE PREFERRED EMBODIMENT

Referring now to the drawings, and particularly to FIG. 1 thereof, the numeral 10 designates generally the moisture feeding apparatus of the present invention for mounting on a suspension device 12 and for feeding moisture such as water on a continuous and consistent basis to plants 90.

Moisture feeding apparatus 10 generally comprises a container or reservoir 14 formed by a pair of separable chambers 16 and 26 which are joined by a cylindrical ring 36 (FIG. 3) having an annular central rib (unnumbered), and a plurality of ribs 38 and valleys 40 for telescoping within an enlarged lower end portion 24 of upper chamber 16 and an enlarged upper end portion 34 of lower chamber 26.

Upper chamber 16 is provided with a reduced neck portion 18 having external threads 20, an internally threaded cap 22 and an enlarged lower portion 24. Lower chamber 26 is provided with a reduced neck portion 28 with external threads (not shown but similar to threads 20), a cap 32 having internal threads 30 (FIG. 2) and an enlarged upper portion 34.

As seen in FIG. 1, suspension filament 42 is provided and includes a first end 44 which is secured to cap 22 by any suitable means such as an adhesive and a second end 46 which is secured to a fastener or ring 48 by any suitable means such as a knot in second end 46 with the ring or fastener 48 being adapted for connection to suspension device 12. The container or reservoir 14 is preferably transparent so that it can be readily observed how much water or other liquid is contained therein and has an indicia strip 15 mounted in or outside the container or reservoir 14 for quantifying the volume of liquid within container or reservoir 14.

As best shown in FIGS. 1 and 2, a pair of hollow funnels 50, each having an enlarged upper portion 52 is secured to cap 32 by any suitable means such as an adhesive, and a tapered lower portion 54 with a small opening 56. A hollow housing 58 having an enlarged upper portion 60 is telescoped and frictionally fit over the enlarged upper portion 52 of each funnel 50 with each hollow housing 58 further including a reduced end portion 62 having an opening 64 therein. A suitable adhesive might be used to secure upper portion 60 of each housing 58 to enlarged upper portion 52 of a respective funnel 50.

Still referring to FIGS. 1 and 2, a pair of hollow, flexible, tubes 66, each having an upper end portion 68 frictionally secured to a respective reduced end portion 62 of hollow housing 58, an intermediate portion 70, and a lower end portion 72 having a plurality of openings 74 in the walls thereof. One or more conventional pins (not shown) may be provided for anchoring the lower end portion 72 of tubes 66 in the soil 88.

As best shown in FIGS. 1 and 4, a pair of adjustable clamp members 76 are provided and positioned in intermediate portion 70 of tubes 66 for controlling the flow of moisture such as water through tubes 66. Each clamp member 76 includes a housing 78 having an opening 80 therethrough, an elongated slot 82 having the shaft 83 of a wheel 84 mounted therein. Wheel 84 acts on a respective tube 66 to enlarge, reduce or completely close the opening in the tube 66 to control the flow of liquid or moisture through tube 66. As seen in FIGS. 4 and 5, tube 66 extends beneath wheel 84 and rests on inner angled or sloped surface 85 having a V-slot 87 therein. As the wheel is rolled from end 89 toward end 91 of clamp member 76 the tube 66 is pinched between the inner angled surface 85 and the walls of V-slot 87 and the wheel 84 to reduce or completely close the opening in tube 66. Each clamp member 76 might be any clamp member that may be adjustable between several positions that totally restricts the flow of moisture through a tube 66 to the free flow of moisture through tube 66. Adjustable clamp members corresponding to clamp members 76 shown in the drawing are available from Cutter/Miles, 4th and Parker Street, Berkeley, Calif. 94701, under the trade designation Roller Clamps, Model No. 995-12.

The reservoir 14, hollow housings 58 and hollow flexible tubes 66 are preferably made of transparent plastic materials; however, they are susceptible of being made of any suitable material, whether transparent or not. As mentioned hereinabove the reservoir 14 can be made of used one, two, three liter or other size plastic bottles in which various colas are packaged when purchased. The use of the empty cola bottles helps the environment in that such bottles will not have to be buried in landfills or treated in a solid waste facility.

The moisture feeding apparatus 10 of the present invention is assembled by telescopically inserting a respective end of cylindrical ring 36 within the enlarged lower end portion 24 of upper chamber 16 and the enlarged upper end portion 34 of lower chamber 26 with the raised ribs 38 of cylindrical ring 36 tightly and frictionally engaging the inner walls of the enlarged lower end portion 24 and the enlarged upper end portion 34. If the frictional connection of upper chamber 16 and lower chamber 26 of reservoir 14 with cylindrical ring 36 is not adequate, a suitable adhesive might be used to bond or secure the cylindrical ring 36 to upper and lower chambers 16 and 26. After the reservoir or container 14 is assembled as explained hereinabove, the cap 22, with filament 42 secured thereto, is threadedly secured to the reduced neck portion 18 of upper chamber 16 and the cap 32, with either one or two funnels 50 secured thereto, is threadedly secured to the reduced neck portion 28 of lower chamber 26. A hollow housing 58 is then secured to the enlarged upper portion 52 of each hollow funnel 50 either by friction or any suitable adhesive. Upper end 68 of a hollow flexible tube 66 is then inserted within the reduced lower portion 62 of a hollow housing 58 and is secured thereto either by friction or a suitable adhesive. An adjustable clamp 76 is then placed over a hollow flexible tube 66 and positioned in the intermediate portion 70 thereof.

In operation, the cap 22 is removed from the upper reduced neck portion 18 of container 14 and the container 14 is filled with a liquid such as water or a mixture with water therein, after which the cap 22 is replaced onto reduced neck portion 18. At this time, each adjustable clamp 76 has the opening in hollow flexible tube 66 completely closed. The container 14 is next suspended from an approximate suspension device 12 by engagement of fastener 48 therewith with the suspension device 12 being located such that the lower end 72 with all openings 74 therein generally resting upon the soil 88 within a plant pot 86. Each clamp 76 is then adjusted by movement of its wheel 84 to a position such that a desired amount of liquid is released to continually and consistently feed the plants 90.

While the above description constitutes the preferred embodiment of the present invention, it will be appreciated that the invention is susceptible to modification, variation and change without departing from the proper scope and fair meaning of the accompanying claims.

I claim:

1. An apparatus adapted for suspension over at least one plant bed for dispensing a predetermined amount of liquid on a continuous and consistent basis to said plant bed, said apparatus comprising:

a first fluid reservoir means having a valveless exit passage for continuously passing said liquid therethrough, a container having an upper chamber and a lower chamber, and means for securing said upper chamber to said lower chamber comprising a hollow, generally, cylindrical ring which telescopes within said upper chamber and said lower chamber;

support means for supporting said first fluid reservoir means above said at least one plant bed;

a second fluid reservoir means disposed in communication with said exit passage of said first fluid reservoir means to receive fluid therefrom;

fluid metering means carried in said second fluid reservoir means to receive and meter the amount of fluid entering said second fluid reservoir means from said first fluid reservoir means;

tube means communicating with said second fluid reservoir means and said at least one plant bed to direct fluid from said second fluid reservoir means to said at least one plant bed; and means secured to said tube means for applying a variable closure pressure to said tube means to control the amount of fluid flowing therethrough, said pressure being variable in a range from zero pressure to an amount which is sufficient to completely shut-off fluid flow.

2. The apparatus of claim 1 wherein said hollow, generally, cylindrical ring includes at least two raised ribs.

3. The apparatus of claim 2 wherein said means for applying a variable closure pressure to said tube means comprises a housing having an opening therethrough, a slot therein, and a wheel disposed within said opening and slot for movement within said housing for selectively controlling the flow of liquid therethrough.

4. The apparatus of claim 3 further including an indicia strip on said container having spaced markings thereon to indicate the amount of liquid remaining in said container.

5. The apparatus of claim 4 wherein said tube means includes a lower section having a plurality of openings in its walls for releasing said liquid to said at least one plant.

6. An apparatus adapted for suspension over at least one plant for dispensing moisture on a continuous and consistent basis to said plant, said apparatus comprising:

a hollow container including a separate upper chamber having a reduced neck portion and an enlarged lower end portion, a separate lower chamber having a reduced neck portion and an enlarged upper end portion, and means for securing said enlarged lower end portion of said separate upper chamber to said enlarged upper end portion of said separate lower chamber;

at least one hollow funnel in communication with said reduced neck portion of said lower chamber, said at least one funnel including an enlarged upper end portion and a tapered lower portion having a opening therein;

a hollow housing including an enlarged upper end portion telescopically received over said enlarged upper end portion of said at least one hollow funnel, and a reduced lower end portion having a small opening therein;

a hollow, flexible, tube including an upper end section in communication with said reduced lower end portion of said hollow housing, an intermediate section, and a lower end section; and an adjustable clamping member positioned on said intermediate section of said flexible tube for controlling the flow of liquid through said hollow, flexible tube.

7. The apparatus of claim 6 wherein said means for securing said enlarged lower end portion of said separate upper chamber to said enlarged upper end portion of said separate lower chamber comprises a hollow, generally, cylindrical ring which telescopes within said enlarged lower end portion of said separate upper chamber and said enlarged upper end portion of said separate lower chamber.

8. The apparatus of claim 7 wherein said hollow, generally, cylindrical ring includes at least two raised ribs.

9. The apparatus of claim 8 wherein said adjustable clamping member comprises a housing having an opening therethrough, a slot therein, and a wheel disposed within said opening and slot for movement within the housing for selectively controlling the flow of liquid therethrough.

10. The apparatus of claim 9 further including an indicia strip on said container having spaced markings thereon to indicate the amount of liquid remaining in said container.

11. The apparatus of claim 10 wherein said lower end section of said hollow flexible tube includes a plurality of openings in its walls for releasing said liquid to said at least one plant.

12. An apparatus adapted for suspension over a plurality of plants for dispensing moisture on a continuous and consistent basis to said plants, said apparatus comprising:

a hollow container including a separate chamber having a reduced neck portion and an enlarged lower end portion, a separate lower chamber having a reduced neck portion and an enlarged upper end portion, and means for securing said enlarged lower end portion of said separate upper chamber to said enlarged upper end portion of said separate lower chamber;

a plurality of hollow funnels in communication with said reduced neck portion of said lower chamber, each of said funnels including an enlarged upper end portion and a tapered lower portion having a small opening therein;

a plurality of hollow housings, each including an enlarged upper end portion telescopically received over said enlarged upper end portion of a respective said funnel, and a reduced lower end portion having a opening therein;

a plurality of hollow, flexible, tubes, each including an upper end section in communication with said reduced lower end portion of a respective said hollow housing, an intermediate section, and a lower end section; and an adjustable clamping member positioned on said intermediate section of each said flexible tube for controlling the flow of liquid through each said, flexible tube.

13. The apparatus of claim 12 wherein said means for securing said enlarged lower end portion of said separate upper chamber to said enlarged upper end portion of said separate lower chamber comprises a hollow, generally, cylindrical ring which telescopes within said enlarged lower end portion of said separate upper chamber and said enlarged upper end portion of said separate lower chamber.

14. The apparatus of claim 13 wherein said hollow, generally, cylindrical ring includes at least two raised ribs.

15. The apparatus of claim 14 wherein each said adjustable clamping member comprises a housing having an opening therethrough, a slot therein, and a wheel disposed within said opening and slot for movement within the housing for selectively controlling the flow of liquid therethrough.

16. The apparatus of claim 15 further including an indicia strip on said container having spaced markings thereon to indicate the amount of liquid remaining in said container.

17. The apparatus of claim 16 wherein said lower end section of each said hollow flexible tube includes a plurality of openings in its walls for releasing said liquid to said plurality of plants.

* * * * *